United States Patent
Sakai et al.

(10) Patent No.: US 9,905,828 B2
(45) Date of Patent: Feb. 27, 2018

(54) BATTERY MODULE

(71) Applicant: KABUSHIKI KAISHA TOYOTA JIDOSHOKKI, Aichi-ken (JP)

(72) Inventors: Takashi Sakai, Kariya (JP); Takayuki Kato, Kariya (JP); Shintaro Watanabe, Kariya (JP); Hidefumi Oishi, Kariya (JP); Hiromi Ueda, Kariya (JP); Naoto Morisaku, Kariya (JP); Kazuki Maeda, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 279 days.

(21) Appl. No.: 14/772,212

(22) PCT Filed: Mar. 7, 2014

(86) PCT No.: PCT/JP2014/055919
§ 371 (c)(1),
(2) Date: Sep. 2, 2015

(87) PCT Pub. No.: WO2014/136929
PCT Pub. Date: Sep. 12, 2014

(65) Prior Publication Data
US 2016/0064716 A1    Mar. 3, 2016

(30) Foreign Application Priority Data

Mar. 8, 2013    (JP) .................................. 2013-046664

(51) Int. Cl.
*H01M 2/20* (2006.01)
*H01M 2/10* (2006.01)
(Continued)

(52) U.S. Cl.
CPC ........... *H01M 2/20* (2013.01); *H01M 2/1077* (2013.01); *H01M 2/204* (2013.01); *H01M 2/206* (2013.01);
(Continued)

(58) Field of Classification Search
None
See application file for complete search history.

(56) References Cited

U.S. PATENT DOCUMENTS

| 6,628,102 B2 | 9/2003 | Batson |
| 2002/0180405 A1 | 12/2002 | Batson |

(Continued)

FOREIGN PATENT DOCUMENTS

| FR | 2462031 | 2/1981 |
| JP | 2009-289428 | 12/2009 |

(Continued)

OTHER PUBLICATIONS

Search Report issued by E.P.O. patent office in E.P.O. Patent Application No. 14760827.7, dated Mar. 4, 2016.

(Continued)

*Primary Examiner* — Jeremiah R Smith
(74) *Attorney, Agent, or Firm* — Greenblum & Bernstein, P.L.C.

(57) ABSTRACT

This battery module is provided with: a cell having a connection terminal; and a bus bar that is connected to the connection terminal and has an upright standing part that extends in the direction in which the connection terminal protrudes. The bus bar is connected, via a conductive wire, to an object to be connected, which is provided at a position separate from the connection terminal in the extending direction of the upright standing part. The cell is configured so as to be charged and discharged through the bus bar and the conductive wire.

5 Claims, 3 Drawing Sheets

(51) Int. Cl.
*H01M 10/0525* (2010.01)
*H01M 10/30* (2006.01)
H01M 10/04 (2006.01)
H01M 2/02 (2006.01)

(52) U.S. Cl.
CPC ....... *H01M 10/0525* (2013.01); *H01M 10/30* (2013.01); *H01M 2/021* (2013.01); *H01M 2/0202* (2013.01); *H01M 10/0468* (2013.01)

(56) References Cited

U.S. PATENT DOCUMENTS

| | | |
|---|---|---|
| 2004/0012396 A1 | 1/2004 | Batson |
| 2004/0212342 A1 | 10/2004 | Batson |
| 2006/0255764 A1 | 11/2006 | Cho |
| 2012/0003507 A1* | 1/2012 | Krieg ................ H01M 2/1016 429/7 |
| 2013/0011719 A1 | 1/2013 | Yasui et al. |
| 2013/0136969 A1* | 5/2013 | Yasui ................ H01M 2/0277 429/99 |
| 2013/0260611 A1* | 10/2013 | Ahn ................ H01M 2/1077 439/627 |
| 2014/0017528 A1 | 1/2014 | Uehara et al. |

FOREIGN PATENT DOCUMENTS

| | | |
|---|---|---|
| JP | 2011-54353 | 3/2011 |
| JP | 2012-520540 | 9/2012 |
| WO | 2012/101728 | 8/2012 |
| WO | 2012/101981 | 8/2012 |
| WO | 2012/132134 | 10/2012 |

OTHER PUBLICATIONS

Search Report issued in PCT/JP2014/055919, dated Apr. 28, 2014.
International Preliminary Report on patentability issued in PCT/JP2014/055919, dated Sep. 8, 2015.

* cited by examiner

BATTERY MODULE

TECHNICAL FIELD

The present invention relates to a battery module.

BACKGROUND ART

Patent Document 1 discloses one example of a rechargeable battery device that serves as a battery pack including battery modules. The rechargeable battery device described in Patent Document 1 includes assemblies of stacked batteries. Each assembly of stacked batteries includes a floor plate, a back plate projecting from the floor plate, and a base plate fixed to the floor plate. A battery module is mounted on the base plate. The battery module contacts the back plate. Side plates, which project from the edges of the base plate, sandwich the battery module. A packing is arranged on the battery module, and another base plate is arranged on the packing. Another battery module is mounted on the base plate. In this manner, the battery modules are stacked.

PRIOR ART DOCUMENT

Patent Document

Patent Document 1: Japanese Laid-Open Patent Publication No. 2011-54353

SUMMARY OF THE INVENTION

Problems that the Invention is to Solve

For example, when connecting the stacked battery modules with a wire, the wire is extended from the connection terminal of a lower battery module to the connection terminal of an upper battery module. A battery cell or the like may exist on a line connecting the connection terminal of the lower battery module and the connection terminal of the upper battery module. Thus, the wire needs to be extended around such a battery cell. This increases the length of the wire. Further, when the bending radius of the wire is large, the space occupied by the bent wire increases. In the same manner, if a wire is extended from the connection terminal of a battery module to the connection terminal of an electronic component located above the battery module, the length of the wire increases when an object exists on a line connecting the connection terminal of the battery module to the connection terminal of the electronic component.

It is an object of the present invention to provide a battery module that is capable of shortening the wire.

Means for Solving the Problem

The battery module that solves the above problem includes a battery cell including a connection terminal and a bus bar connected to the connection terminal. The bus bar includes an upright portion extending in a direction in which the connection terminal projects. The bus bar is connected by a wire to a connected body that is arranged at a location separated from the connection terminal in the extension direction of the upright portion. The battery cell is configured to be charged and discharged through the bus bar and the wire.

EMBODIMENTS OF THE INVENTION

One embodiment of a battery module will now be described.

Figure 1:
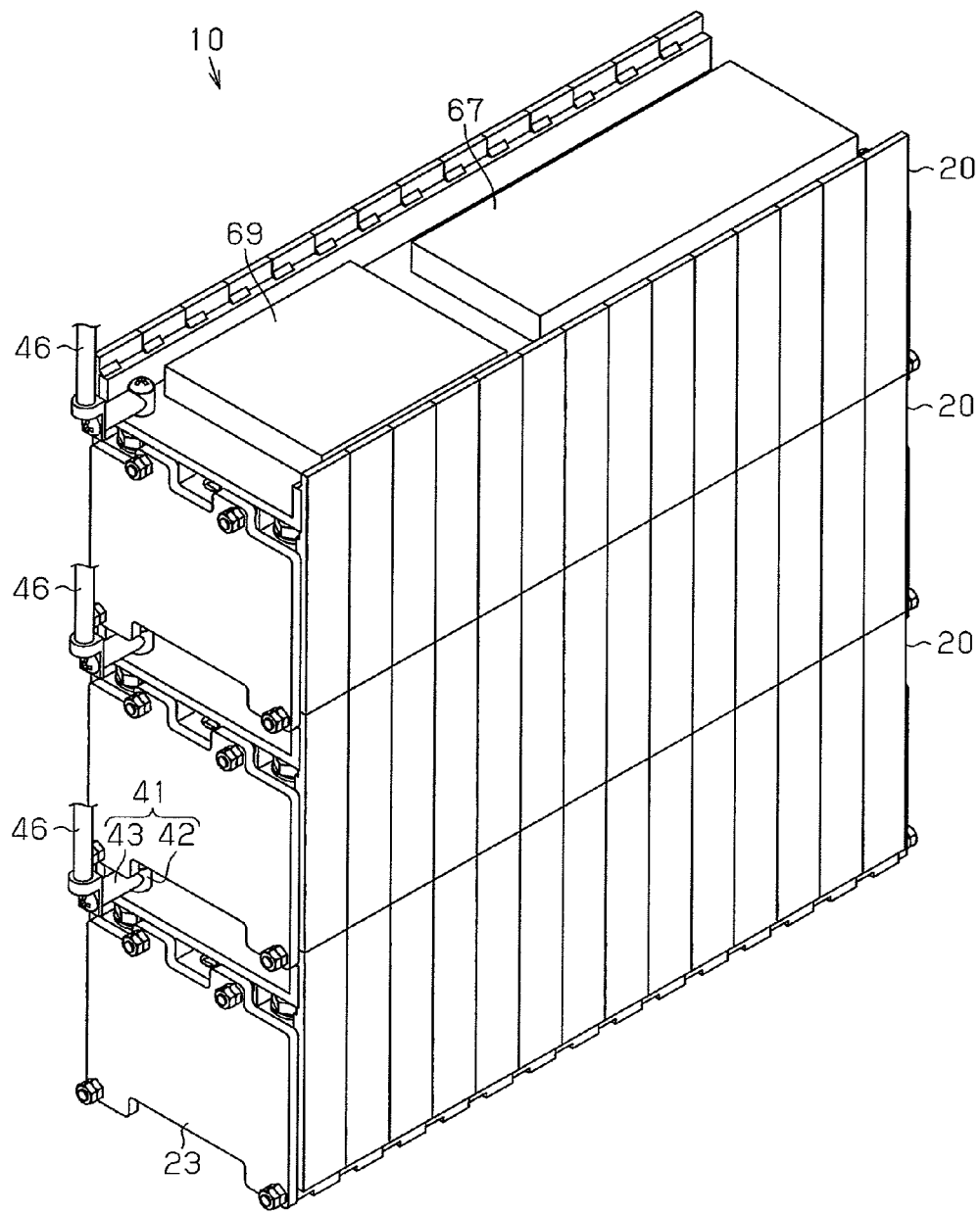
FIG. 1 is a perspective view showing one embodiment of a battery pack.

As shown in FIG. 1, a battery pack 10 includes three stacked battery modules 20.

Figure 2:
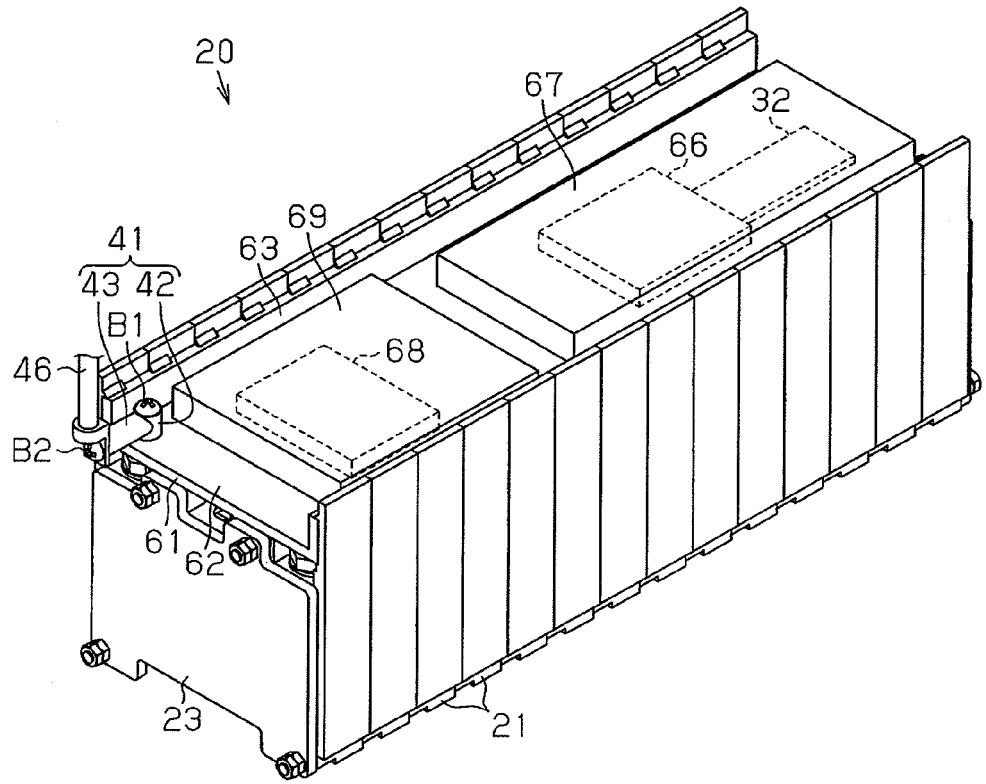
FIG. 2 is a perspective view of a battery module in the battery pack shown in FIG. 1.
Figure 3:
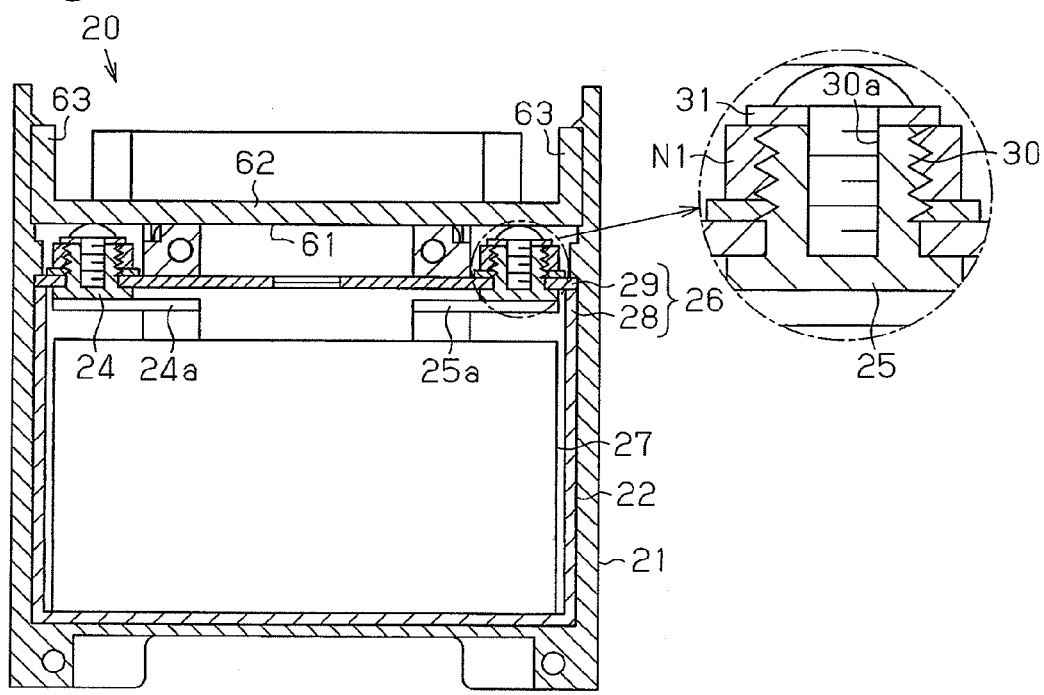
FIG. 3 is a cross-sectional view of the battery module shown in FIG. 2.

As shown in FIGS. 2 and 3, each battery module 20 includes a plurality of prismatic batteries 22, which serve as battery cells. The prismatic batteries 22 are each held by a battery holder 21 and arranged side by side in the thickness-wise direction of the prismatic batteries 22. In the battery module 20, end plates 23 are arranged at the two ends of the prismatic batteries 22 in the direction the prismatic batteries 22 are laid out. The prismatic batteries 22 are arranged so that a positive terminal 24 and a negative terminal 25 of adjacent ones of the prismatic batteries 22 are adjacent to each other. The prismatic battery 22 is a rechargeable battery such as a lithium-ion rechargeable battery or a nickel-metal hydride battery.

Figure 4:
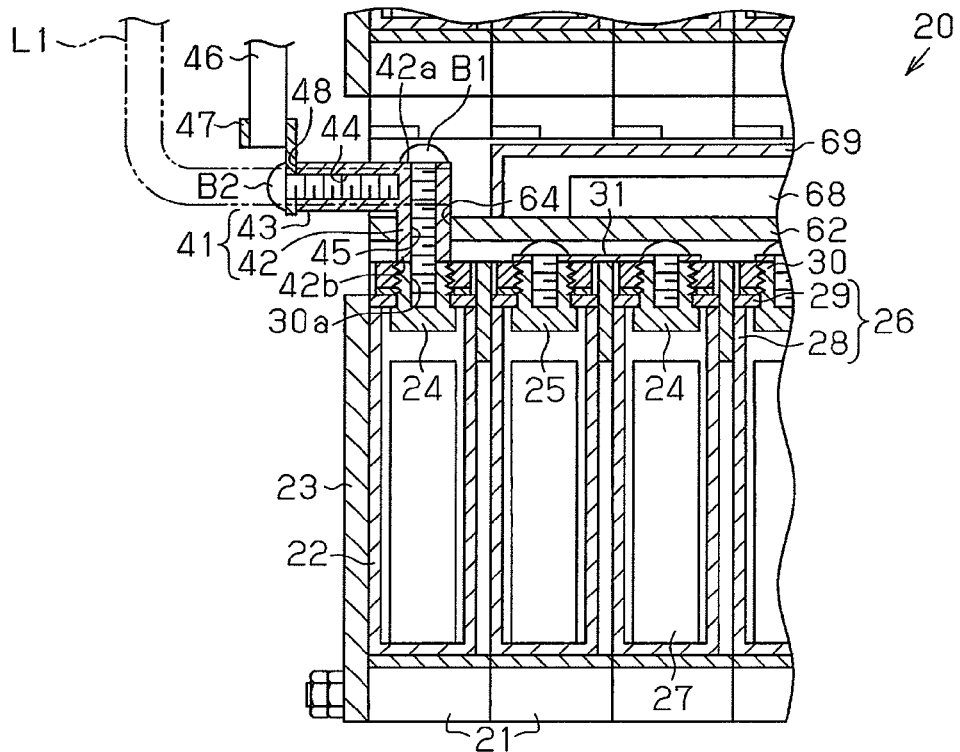
FIG. 4 is an enlarged cross-sectional view showing one end of the battery module in FIG. 2.
Figure 5:
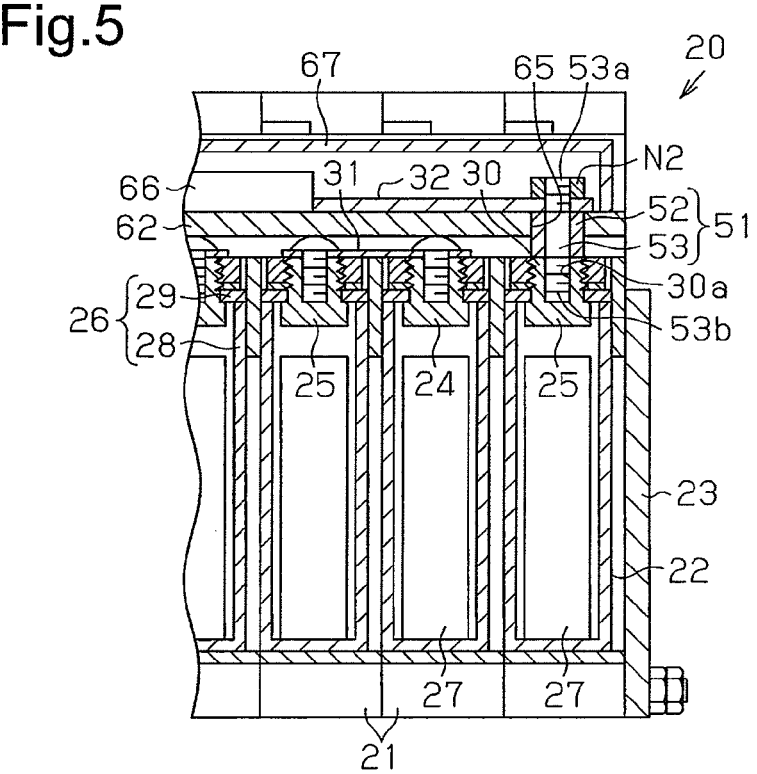
FIG. 5 is an enlarged cross-sectional view showing the other end of the battery module in FIG. 2.

As shown in FIGS. 4 and 5, the positive terminal 24 and the negative terminal 25 of adjacent ones of the prismatic batteries 22 are connected by a flat bus bar 31. A first upright bus bar 41 is arranged on the prismatic battery 22 located at a first end of a prismatic battery row in the layout direction of the prismatic batteries 22. A second upright bus bar 51 is arranged on the prismatic battery 22 located at a second end of the prismatic battery row in the layout direction of the prismatic batteries 22. More specifically, the first upright bus bar 41 is connected to the positive terminal 24 of the prismatic battery 22 located at the first end of the prismatic battery row, and the second upright bus bar 51 is connected to the negative terminal 25 of the prismatic battery 22 located at the second end of the prismatic battery row.

In the battery module 20, the flat bus bar 31, which connects the positive terminal 24 and the negative terminal 25 of the adjacent prismatic batteries 22, is a member that connects the prismatic batteries 22 in series. In the battery module 20, the upright bus bars 41 and 51 are members that connect the battery module 20, in which the prismatic batteries 22 are connected in series, to another battery module 20 or other electronic components. The series-connected prismatic batteries 22 are charged and discharged through the upright bus bars 41 and 51.

As shown in FIG. 2, the battery holders 21 hold a mounting plate 61, which serves as a plate member on which electronic components are mounted. The mounting plate 61 includes a body 62, which has the form of a tetragonal plate, and extensions 63, which extend in the thickness-wise direction of the body 62 from the two lateral ends of the body 62. The mounting plate 61 is arranged above the prismatic batteries 22 (i.e., upper side with respect to stacking direction of battery modules 20).

A relay 66 is mounted on the mounting plate 61. The relay 66 controls the discharging and discharging interruption of the prismatic batteries 22. The relay 66 is covered by a rectangular tubular relay cover 67, which has a bottom. A flat bus bar 32, which serves as a wire connected to a connection terminal of the relay 66, is arranged in the relay cover 67. A battery ECU 68, which controls the prismatic batteries 22, is arranged on the mounting plate 61. The battery ECU 68 is covered by a rectangular tubular ECU cover 69, which has a bottom. The relay 66 and the battery ECU 68 are electronic components that contribute to the charging and discharging of the prismatic batteries 22 (battery modules 20). Electronic components other than the relay 66 (not shown) are also accommodated in the relay cover 67.

As shown in FIGS. 4 and 5, the mounting plate 61 includes through holes 64 and 65. The through hole 64 is opposite to the positive terminal 24 of the prismatic battery 22 located at the first end of the prismatic battery row. The through hole 65 is opposite to the negative terminal 25 of the prismatic battery 22 located at the second end of the prismatic battery row. That is, the through holes 64 and 65 are opposite to the terminals on which the upright bus bars 41 and 51 are arranged.

As shown in FIG. 3, the prismatic battery 22 includes a battery case 26 and an electrode assembly 27, which is accommodated in the battery case 26. The battery case 26 includes a box-shaped body 28, which accommodates the electrode assembly 27, and a lid 29, which has the form of a tetragonal plate and closes an opening of the body 28. The lid 29 includes the positive terminal 24 and the negative terminal 25, which serve as connection terminals. In the present embodiment, the projection direction (extension direction) of the positive terminal 24 and the negative terminal 25 is the same as the thickness-wise direction of the lid 29 (height-wise direction of prismatic battery 22). The electrode assembly 27 includes a plurality of stacked positive and negative electrodes. The positive terminal 24 and the negative terminal 25 are electrically connected to the electrode assembly 27 by a positive conductive member 24*a* and a negative conductive member 25*a*, respectively. The positive terminal 24 and the negative terminal 25 each include a rod 30, which projects from the inside of the battery case 26 to the outside of the battery case 26. A circumferential surface of a distal end of the rod 30 (end projecting outside battery case 26) is threaded. When a nut N1 is fastened to the threaded surface, the positive terminal 24 and the negative terminal 25 are fixed to the battery case 26. The positive terminal 24 and the negative terminal 25 each include a bolt hole 30*a*, which extends from the distal end of the rod 30 in the axial direction of the rod 30. The wall of the bolt hole 30*a* is threaded.

As shown in FIG. 4, the first upright bus bar 41 includes a cylindrical upright portion 42. An extension 43 is arranged at a first axial end 42*a* of the upright portion 42 and extends in a direction orthogonal to the axial direction of the upright portion 42. The extension 43 includes a basal end and a distal end in the direction the extension 43 extends. The basal end is connected to the upright portion 42. The extension 43 includes a fastening hole 44, which extends in the extension direction of the extension 43 from the distal end. The wall of the fastening hole 44 is threaded. An end surface 48 of the distal end of the extension 43 (surface to which wire is connected) extends in the projection direction of the positive terminal 24 and the negative terminal 25. In other words, the end surface 48 is substantially parallel to the projection direction.

In the first upright bus bar 41, the end surface of a second axial end 42*b* of the upright portion 42 (end opposite to first axial end 42*a* of upright portion 42) is joined with the positive terminal 24 of the prismatic battery 22. More specifically, a bolt B1, which is inserted from the first axial end 42*a* of the upright portion 42 through a hole 45 of the upright portion 42, is fastened to the bolt hole 30*a* in the positive terminal 24 of the prismatic battery 22 so that the upright portion 42 is arranged on the positive terminal 24. Thus, the upright portion 42 extends from the positive terminal 24 of the prismatic battery 22 in the projection direction of the positive terminal 24 (height-wise direction of prismatic battery 22). The upright portion 42 extends through the through hole 64 in the mounting plate 61 so that the first axial end 42*a* projects from the mounting plate 61. The extension 43 of the first upright bus bar 41 extends to where a battery module 20 does not exist above the extension 43, that is, a location on a line that is parallel to the extension direction of the upright portion 42 and does not interfere with a battery module 20. Thus, the extension 43 extends so that the extension 43 allows a power wire 46 (described below) to extend straight.

The power wire 46, which serves as a wire, is joined with the end surface 48 of the first upright bus bar 41. The power wire 46 is attached to the end surface 48 of the first upright bus bar 41 by inserting a bolt B2 through a connecting member 47, which is arranged on an axial end of the power wire 46, and fastening the bolt B2 to the fastening hole 44 of the extension 43. Thus, the end surface 48 of the first upright bus bar 41 functions as a connection surface to which the power wire 46 is connected. The power wire 46 extends straight in the stacking direction of the battery modules 20 (extension direction of upright portion 42) without being bent. Adjacent ones of the stacked battery modules 20 are electrically connected by each power wire 46. Thus, the battery modules 20, in which the prismatic batteries 22 are connected in series, are connected in parallel to each other. The connection subject (connected body) of the first upright bus bar 41 is another battery module 20 stacked on the battery module 20 to which the first upright bus bar 41 is connected, that is, another battery module 20 arranged at a location separated from the positive terminal 24, to which the first upright bus bar 41 is connected, in the extension direction of the upright portion 42.

As shown in FIG. 5, the second upright bus bar 51 includes a cylindrical member 52 and a shaft member 53, which is inserted through the cylindrical member 52. The cylindrical member 52 and the shaft member 53 form an upright portion. More specifically, the entire second upright bus bar 51 functions as an upright portion. The shaft member 53 is a stud bolt that includes two threaded axial ends. A first axial end 53*a* of the shaft member 53 extends through the flat bus bar 32. A second axial end 53*b* of the shaft member 53 is fastened to the bolt hole 30*a* in the negative terminal 25 of a prismatic battery 22. A nut N2 is fastened to the first axial end 53*a*, which extends through the flat bus bar 32. Thus, the second upright bus bar 51 is fixed between the negative terminal 25 of the prismatic battery 22 and the flat bus bar 32 and arranged on the negative terminal 25. The connection subject (connected body) of the second upright bus bar 51 is the relay 66, which is arranged above the negative terminal 25, that is, arranged at a location separated from the negative terminal 25 in the extension direction of the second upright bus bar 51.

In the present embodiment, the first upright bus bar 41 and the second upright bus bar 51 that are arranged upright from the connection terminals of the prismatic batteries 22 (positive terminal 24 and negative terminal 25) correspond to the claimed bus bar. The power wire 46 that is connected to the first upright bus bar 41 and connects the battery modules 20 to each other corresponds to the claimed wire. The flat bus bar 32 that is connected to the second upright bus bar 51 and connects the battery modules 20 to the relay 66 also corresponds to the claimed wire. More specifically, the claimed wire refers to a conductor including one end connected to the bus bar, which projects from the connection terminal, and another end connected to the connected body. The claimed wire also includes a conductor other than a linear conductor.

The operation of the battery module 20 of the present embodiment will now be described.

As shown in FIG. 4, for example, when the connection terminals of the stacked battery modules 20 are connected to each other by a wire L1 and an object exists on a line that connects the connection terminals of the stacked battery modules 20, the wire L1 needs to be extended around the object. When the wire L1 cannot be bent at a right angle, the bending radius of the wire L1 increases the amount in which the wire L1 projects from the battery module 20. This enlarges the space necessary for the bent wire L1. In particular, when a thick wire is used to reduce the resistance of the power wire through which current discharged from the prismatic battery 22 flows, the bending radius tends to increase in proportion to the thickness of the wire L1. The power wire could be thinned to reduce the bending radius. However, the increased resistance of the power wire would increase the Joule loss. Thus, thinning the power wire is not realistic.

In the present embodiment, the first upright bus bar 41 includes the upright portion 42 and the extension 43. Thus, the location where the power wire 46 is joined with the first upright bus bar 41 may be shifted so that no object exists on a line connecting the two ends of the power wire 46. This allows the power wire 46 to extend straight in the stacking direction of the battery modules 20 without being bent.

The second upright bus bar 51 is inserted through the through hole 65 of the mounting plate 61 and connected to the flat bus bar 32 on the mounting plate 61. Thus, the relay 66 on the mounting plate 61 may be easily connected to the prismatic batteries 22.

Accordingly, the embodiment has the advantages described below.

(1) The second upright bus bar 51 projects in the projection direction of the connection terminals. The connection terminal of the prismatic battery 22 and the connection terminal of the relay 66, which is arranged above the prismatic battery 22, are connected by the second upright bus bar 51 and the wire (flat bus bar 32). Thus, when an object exists on a line connecting the connection terminal of the prismatic battery 22 and the connection terminal of the relay 66, the flat bus bar 32 is connected to the end of the second upright bus bar 51, which is located above the connection terminal of the prismatic battery 22, so that an object does not exist on a line that connects the two ends of the flat bus bar 32. This allows the wire (flat bus bar 32) to be shortened and facilitates connecting.

(2) The first upright bus bar 41 includes the extension 43, which extends from the upright portion 42 in a direction orthogonal to the extension direction of the upright portion 42. The location where the power wire 46 is joined with the first upright bus bar 41 may be shifted by the extension 43 in the horizontal direction relative to the location of the upright portion 42 (direction intersecting extension direction of upright portion 42). This avoids a situation in which an object exists on a line that connects the two ends of the power wire 46. This reduces the space occupied by the power wire 46.

(3) The second upright bus bar 51 is inserted through the through hole 65 in the mounting plate 61 and connected to the flat bus bar 32 on the mounting plate 61. Thus, the electronic components on the mounting plate 61 may be easily connected to the prismatic batteries 22.

The embodiment may be modified as follows.

The extension 43 is extended in a direction intersecting the extension direction of the upright portion 42. The extension 43 may be extended and inclined relative to a direction orthogonal to the extension direction of the upright portion 42.

The upright portion 42 and the extension 43 do not have to be cylindrical. For example, the upright portion 42 and the extension 43 may have the form of a polygonal tube such as a quadrangular tube and may have another form. In the same manner, the second upright bus bar 51 may have another form such as a quadrangular tube.

The battery components that contribute to charging and discharging the prismatic batteries 22 do not have to be arranged on the mounting plate 61. In such a case, the mounting plate 61 may be omitted.

The number of battery modules 20 may be changed. Further, there may be only one battery module 20.

The battery module 20 does not have to include the battery holder 21. The battery module 20 may be configured so that only the prismatic batteries 22 are laid out.

A cylindrical battery or a laminated battery may be used as the battery cell.

The extension 43 of the first upright bus bar 41 do not have to be arranged so that the axis of the fastening hole 44 intersects the hole 45 of the upright portion 42. This limits interference of the bolt B2 inserted through the fastening hole 44 with the hole 45 of the upright portion 42.

The upright bus bars 41 and 51 may be arranged on a prismatic battery 22 other than the prismatic batteries 22 that are arranged at the two ends of the prismatic battery row in the layout direction of the prismatic batteries 22.

The upright bus bars 41 and 51 may be welded to the positive terminal 24 and the negative terminal 25 of the prismatic battery 22. Further, the upright bus bars 41 and 51 may be connected to the positive terminal 24 and the negative terminal 25 through another process.

The extension 43 does not have to extend to a location where an obstacle (battery module 20) does not exist above the location. Even in such a case, when the extension 43 is extended to the vicinity of a location where an obstacle does not exist above the location, the bending radius of the power wire 46 is reduced and the power wire 46 is shortened. When the battery module 20 includes a through hole that extends in the vertical direction, the extension 43 may be extended to the through hole so that the power wire 46 is inserted through the through hole.

The flat bus bar 32 may be replaced with a wire.

The first upright bus bar 41 may be connected to a connected body that is mounted on the mounting plate 61 such as the relay 66. In this case, the extension 43 extends toward the relay 66, and the extension 43 and the relay 66 are connected by a wire. When a location where the wire is connected to the first upright bus bar 41 is shifted in the extension direction of the upright portion 42, it is possible to avoid a situation in which an object exists on a line that connects the two ends of the wire. Further, since the extension 43 extends toward the relay 66, the wire is shorter than when the wire is connected to the upright portion 42.

The invention claimed is:

1. A battery module comprising:
   a battery cell including a connection terminal; and
   a bus bar connected to the connection terminal, wherein the bus bar includes an upright portion extending in a direction in which the connection terminal projects, wherein:

the bus bar is connected by a wire to a connected body that is arranged at a location separated from the connection terminal in an extension direction of the upright portion; and the battery cell is configured to be charged and discharged through the bus bar and the wire, the bus bar further including an extension that is connected to the upright portion and extends in a direction intersecting the extension direction of the upright portion, the extension includes a basal end and a distal end, which is arranged at an opposite side of the basal end in an extension direction of the extension, wherein the basal end is connected to the upright portion and the distal end is joined with the wire, and wherein the extension is defined by a hollow cylindrical portion.

2. The battery module according to claim 1, wherein:

the connected body is arranged on a plate member; and the upright portion is inserted through a through hole of the plate member, and wherein the extension is positioned vertically above the plate member.

3. The battery module according to claim 1, wherein:

the extension includes a surface configured to extend in the extension direction of the upright portion and be connected to the wire.

4. A battery module comprising:

a plurality of battery cells arranged in a layout direction to form a battery cell row, wherein each battery cell includes a connection terminal;

end plates arranged at two ends of the battery cell row in the layout direction;

a bus bar connected to the connection terminal of a first battery cell located at one end of the battery cell row, wherein the bus bar includes an upright portion extending in a direction in which the connection terminal projects and an extension that is connected to the upright portion, the extension extending outside an outer surface of the end plate adjacent to the first battery cell in a direction intersecting an extension direction of the upright portion, wherein:

the extension includes a basal end and a distal end, which is arranged at an opposite side of the basal end in an extension direction of the extension, wherein the basal end is connected to the upright portion, and the distal end is connected by a wire to a connected body that is arranged at a location separated from the connection terminal of the first battery cell in the extension direction of the upright portion;

a plate member is arranged above the battery cells and includes a through hole opposite to the connection terminal of the first battery cell;

the upright portion is inserted through the through hole;

the battery cells are configured to be charged and discharged through the bus bar and the wire; and wherein the extension is positioned vertically above the plate member.

5. The battery module according to claim 4, wherein the extension includes a surface configured to extend in the extension direction of the upright portion and be connected to the wire.

* * * * *